(12) United States Patent
Marques et al.

(10) Patent No.: US 6,789,315 B2
(45) Date of Patent: Sep. 14, 2004

(54) ESTABLISHING A THROAT AREA OF A GAS TURBINE NOZZLE, AND A TECHNIQUE FOR MODIFYING THE NOZZLE VANES

(75) Inventors: Marcio Lins Tinoco Marques, Niteroi (BR); Tathiana Carneiro de Rezende, Rio de Janeiro (BR); Andreas Martin von Montfort, Petropolis (BR); David Edwin Budinger, Loveland, OH (US); William G. Messelling, Englewood, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/104,757

(22) Filed: Mar. 21, 2002

(65) Prior Publication Data

US 2003/0177640 A1 Sep. 25, 2003

(51) Int. Cl.[7] ................................................ B23P 15/00
(52) U.S. Cl. ................................... 29/889.22; 29/889.1
(58) Field of Search ........................... 29/889.1, 889.22, 29/407.05, 407.01, 407.1, 407.09, 428; 415/193, 209.1, 160, 148; 416/223 R, 223 B; 228/119, 182, 262.45

(56) References Cited

U.S. PATENT DOCUMENTS

| | | |
|---|---|---|
| 4,028,787 A | 6/1977 | Cretella et al. |
| 4,141,127 A | 2/1979 | Cretella et al. |
| 4,307,994 A | 12/1981 | Brewer |
| 4,726,101 A | 2/1988 | Draghi et al. |
| 4,830,934 A | 5/1989 | Ferrigno et al. |
| 5,060,842 A | 10/1991 | Qureshi et al. |
| 5,193,736 A | 3/1993 | Marijnissen et al. |
| 5,522,134 A | 6/1996 | Rowe et al. |
| 5,569,546 A | 10/1996 | Ferrigno et al. |
| 5,630,701 A | 5/1997 | Lawer |
| 6,022,188 A | 2/2000 | Bancalari |
| 2002/0141864 A1 * | 10/2002 | Burdgick .................... 415/193 |

FOREIGN PATENT DOCUMENTS

| | | |
|---|---|---|
| EP | 0 504 095 A2 | 9/1992 |
| EP | 1 013 788 A1 | 6/2000 |
| WO | WO 01/64964 A1 | 9/2001 |

\* cited by examiner

Primary Examiner—Irene Cuda-Rosenbaum
(74) Attorney, Agent, or Firm—Gregory O. Garmong; Carmen Santa Maria; McNees Wallace & Nurick LLC (57) ABSTRACT

A final throat area of a gas turbine nozzle circumferential structure is established by providing at least two gas turbine nozzle vanes, and determining a pairwise initial throat area between each pair of gas turbine nozzle vanes. For each pair of gas turbine nozzle vanes whose pairwise initial throat area is not within the final pairwise throat area target range, a trailing edge of at least one of the gas turbine nozzle vanes is extended responsive to the step of determining the initial pairwise throat area, so that a final pairwise throat area is within a final pairwise throat area target range. A nozzle plurality of pairs of gas turbine nozzle vanes that together comprise the gas turbine nozzle circumferential structure may be selected so that a sum of their final pairwise throat areas is within a final total throat area target range. The trailing edge may be extended for this or other purposes by affixing an extension wire to the trailing edge extending lengthwise along the trailing edge, applying a braze material to the extension wire and the trailing edge, and heating the braze material to a brazing temperature to melt at least a portion of the braze material and, upon cooling, to bond the extension wire and the braze material to the trailing edge.

20 Claims, 5 Drawing Sheets

ESTABLISHING A THROAT AREA OF A GAS TURBINE NOZZLE, AND A TECHNIQUE FOR MODIFYING THE NOZZLE VANES

This invention relates to gas turbine engines and, more particularly, to the stationary nozzle vane structure of the gas turbine engine.

BACKGROUND OF THE INVENTION

In an aircraft gas turbine (jet) engine, air is drawn into the front of the engine, compressed by a shaft-mounted compressor, and mixed with fuel. The mixture is burned, and the resulting hot combustion gases are passed through a gas turbine mounted on the same shaft. The flow of combustion gas turns the gas turbine by contacting an airfoil portion of the turbine blade, which turns the shaft and provides power to the compressor. The hot exhaust gases flow from the back of the engine, driving it and the aircraft forward. There may additionally be a bypass fan that forces air around the center core of the engine, driven by a shaft extending from the turbine section.

The combustion gas flowing from the combustor of the gas turbine engine enters a stationary (that is, not rotating) nozzle structure having a plurality of stationary nozzle vanes that extend radially around the circumference of the combustion gas flow path of the generally cylindrical gas turbine engine. The gas turbine nozzle vanes act as a nozzle to accelerate and redirect the combustion gas flow slightly so that it enters the turbine at the proper velocity and angle. The redirected combustion gas flow impinges upon turbine blades extending radially from a turbine wheel that is rotatable about the turbine shaft, causing the turbine wheel to turn and thence to drive the compressor.

One of the important operating parameters of the gas turbine engine is the area of the stationary nozzle vane structure through which the combustion gas flow passes, termed the throat area. The total throat area, a design parameter of the gas turbine engine, determines the turbine flow function, which in turn sets the compressor pressure ratio and operating line, and is an important parameter in determining the compressor stall margin. Desirably, the pairwise throat area between each pair of gas turbine nozzle vanes is maintained within a selected pairwise throat area target range, and also the total throat area for all of the pairs of gas turbine nozzle vanes is maintained within a selected total throat area target range.

The nozzle vanes are manufactured to close dimensional tolerances, but the variations within the tolerances and the assembly tolerances may be sufficiently great that, upon assembly of the gas turbine engine, adjacent pairs of gas turbine nozzle vanes do not meet the pairwise throat area target range, or that the total set of nozzle vanes do not meet the total throat area target range. The problem of deviation from the throat area target ranges becomes even more significant after the gas turbine engine has been in service and the dimensions of the nozzle vanes have changed by nonuniform amounts from nozzle vane to nozzle vane due to erosion, burning of the vane material, and other effects. In that case, the overhauling of the gas turbine engine includes replacing or repairing the individual nozzle vanes, and then selecting the proper pairings of nozzle vanes to meet the pairwise and total throat area target ranges.

Even though the individual nozzle vanes are expensive to produce, it is often necessary during the overhaul of the gas turbine engine to scrap many of the used nozzle vanes and replace them with new-make nozzle vanes in order to meet the throat area target ranges. Repair techniques have been proposed for the nozzle vanes, but the available techniques are not fully acceptable because they may result in undesirable alterations to the performance of the nozzle vanes. There is accordingly a need for an improved approach to the repair of nozzle vanes so that their performance is acceptable and also so that the throat area target ranges are met. The present invention fulfills this need, and further provides related advantages.

BRIEF SUMMARY OF THE INVENTION

The present invention provides a technique for establishing the throat area of the gas turbine nozzle, and a repair procedure for the individual nozzle vanes. The present approach allows both the pairwise throat area target range and the total throat area target range to be met. The repair procedure is utilized to provide the individual nozzle vanes with the proper dimensions to meet the pairwise throat area target range, and then the pairs of nozzle vanes are combined to meet the total throat area target range. It may also be used to alter the dimensions of the nozzle vanes for other reasons. The repair procedure substantially maintains the airfoil shape of the nozzle vanes.

A method for establishing a final throat area of a gas turbine nozzle comprises the steps of providing a final pairwise throat area target range, providing at least two gas turbine nozzle vanes, and thereafter determining a pairwise initial throat area between each pair of gas turbine nozzle vanes. Thereafter, for each pair of gas turbine nozzle vanes whose pairwise initial throat area is not within the final pairwise throat area target range, a trailing edge of one of the gas turbine nozzle vanes is extended responsive to the step of determining the initial pairwise throat area, so that the final pairwise throat area is within the final pairwise throat area target range.

The method is typically extended to a nozzle plurality of pairs of gas turbine nozzle vanes together comprising a gas turbine nozzle circumferential structure. A final total throat area target range is provided, and the nozzle plurality of pairs of gas turbine nozzle vanes is selected so that a sum of their final pairwise throat areas is within the final total throat area target range.

The step of extending the trailing edge preferably includes the steps of providing one of the gas turbine nozzle vanes having a rounded trailing edge extending lengthwise between a root and a tip of the gas turbine nozzle vane, affixing an extension wire to the trailing edge extending lengthwise along the trailing edge, applying a braze material overlying the extension wire and the trailing edge, and brazing the braze material to the extension wire and to the trailing edge. The brazing is desirably accomplished by heating the braze material to a brazing temperature to melt at least a portion of the braze material and, upon cooling, to bond the extension wire and the braze material to the trailing edge. The extending of the trailing edge may be accomplished in conjunction with the establishing of the final throat areas as discussed above, or independently of any considerations of the throat area and for other reasons.

In a typical case, the gas turbine nozzle vane is made of a nozzle-vane nickel-base superalloy, and the extension wire is made of an extension-wire nickel-base superalloy. For example, the nozzle-vane nickel-base superalloy may be directionally solidified Rene$^R$ 142 or Alloy X-40, and the extension wire nickel-base superalloy may be Rene$^R$ 142 nickel-base superalloy.

In a preferred approach, the step of applying the braze material includes the step of applying a first layer of a high-melt filler alloy into a gap region between the extension wire and the trailing edge, and applying a second layer of a braze composition overlying the first layer. The first layer is normally a first-layer nickel-base superalloy having a first-layer-nickel-base-superalloy melting point greater than the brazing temperature, such as Rene$^R$ N4 or Rene$^R$ 142 nickel-base superalloys. The second layer is a second-layer nickel-base superalloy braze material having a second-layer-nickel-base-superalloy melting point less than the brazing temperature, such as a mixture of 40 percent by weight Rene$^R$ 142 superalloy and 60 percent by weight of Rene$^R$ 80 nickel-base superalloy modified by the addition of silicon and possibly boron to reduce its melting point. The brazing temperature for this preferred braze material is typically from about 2190° F. to about 2240° F.

The present approach alters the nozzle vanes by extending their trailing edges. The shape of the airfoil of the nozzle vanes is not substantially altered. By contrast, in some prior approaches for repairing nozzle vanes, extra material is applied to the airfoil surfaces of the nozzle vane, rather than to the trailing edge, to thicken the nozzle vane. The thickening of the nozzle vane may change the airfoil profile, so that the aerodynamic performance of the nozzle vane is altered.

The present approach for extending the trailing edge is readily implemented by tack welding the extension wire to the trailing edge, and then applying the braze material to form smooth aerodynamic surfaces at the trailing edge. The diameter of the extension wire may be selected depending upon the amount of extension required. Upon heating, the braze material partially melts and brazes the extension wire to the trailing edge. Protective coatings such as diffusion or overlay aluminides may optionally be applied overlying the trailing edge and its extension.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
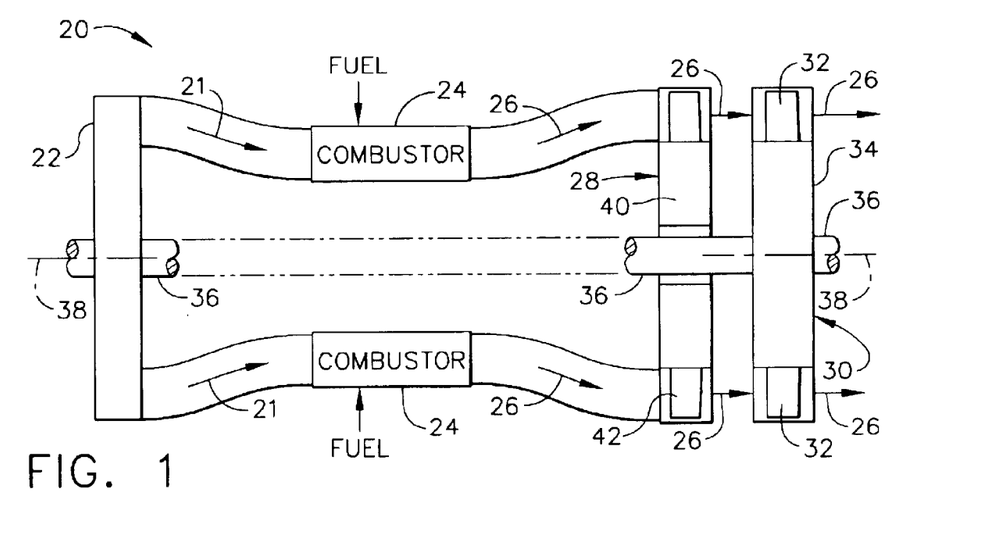
FIG. 1 is a schematic elevational sectional view of a compressor, a combustor, a gas turbine nozzle circumferential structure, and a gas turbine.

FIG. 1 schematically depicts those components of a gas turbine engine 20 that are pertinent to the present discussion. A flow of compressed air 21, from an axial flow compressor 22, and fuel are supplied to a combustor 24 extending toroidally around a centerline of the gas turbine engine 20. The fuel is mixed with the compressed air 21 and burned in the combustor 24, generating a combustion gas flow 26. The combustion gas flow 26 passes through a gas turbine nozzle circumferential structure 28, wherein its velocity and flow direction are altered so as to be of the proper velocity and orientation when it passes through a gas turbine 30. The combustion gas flow 26 impinges upon turbine blades 32 that extend radially from a turbine disk 34 of the gas turbine 30. The turbine disk 34 is mounted on a shaft 36 and turns under the force of the impingement of the combustion gas flow 26 on the turbine blades 32. The shaft 36 extends forward to the compressor 22, which is mounted on the shaft 36 so that it turns as the turbine disk 34 and the shaft 36 turn. The gas turbine nozzle circumferential structure 28 is not mounted to the shaft 36 and is stationary in the sense that it does not turn with the shaft 36. After the combustion gas flow 26 passes through the gas turbine 30, it flows out of the back of the gas turbine engine 20 to create forward thrust. In an actual gas turbine engine, there are multiple compressor stages in air flow succession in the compressor 22, and multiple pairs of gas turbine nozzle circumferential structures 28 and gas turbines 30 in succession along the combustion gas flow 26, so that the combustion gas flow 26 passes through the pairs in succession. The illustrated portion of the gas turbine engine 20 is generally cylindrically symmetric about an axis of rotation 38 of the shaft 36, which serves as a centerline.

Figure 2:
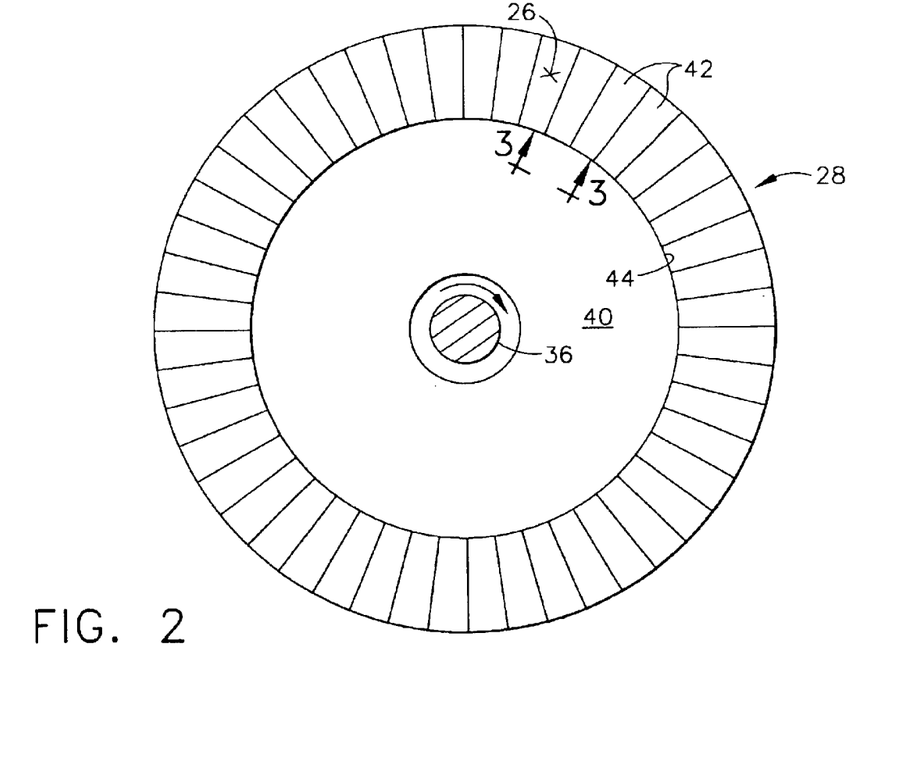
FIG. 2 is an enlarged plan view of the gas turbine nozzle circumferential structure.

FIG. 2 illustrates the gas turbine nozzle circumferential structure 28 in greater detail. The gas turbine nozzle circumferential structure 28 includes a nozzle support structure 40 and a plurality of nozzle vanes 42 extending radially at a periphery 44 of the nozzle support structure 40. The combustion gas flow 26 is perpendicular to the plane of the illustration in FIG. 2.

Figure 3:
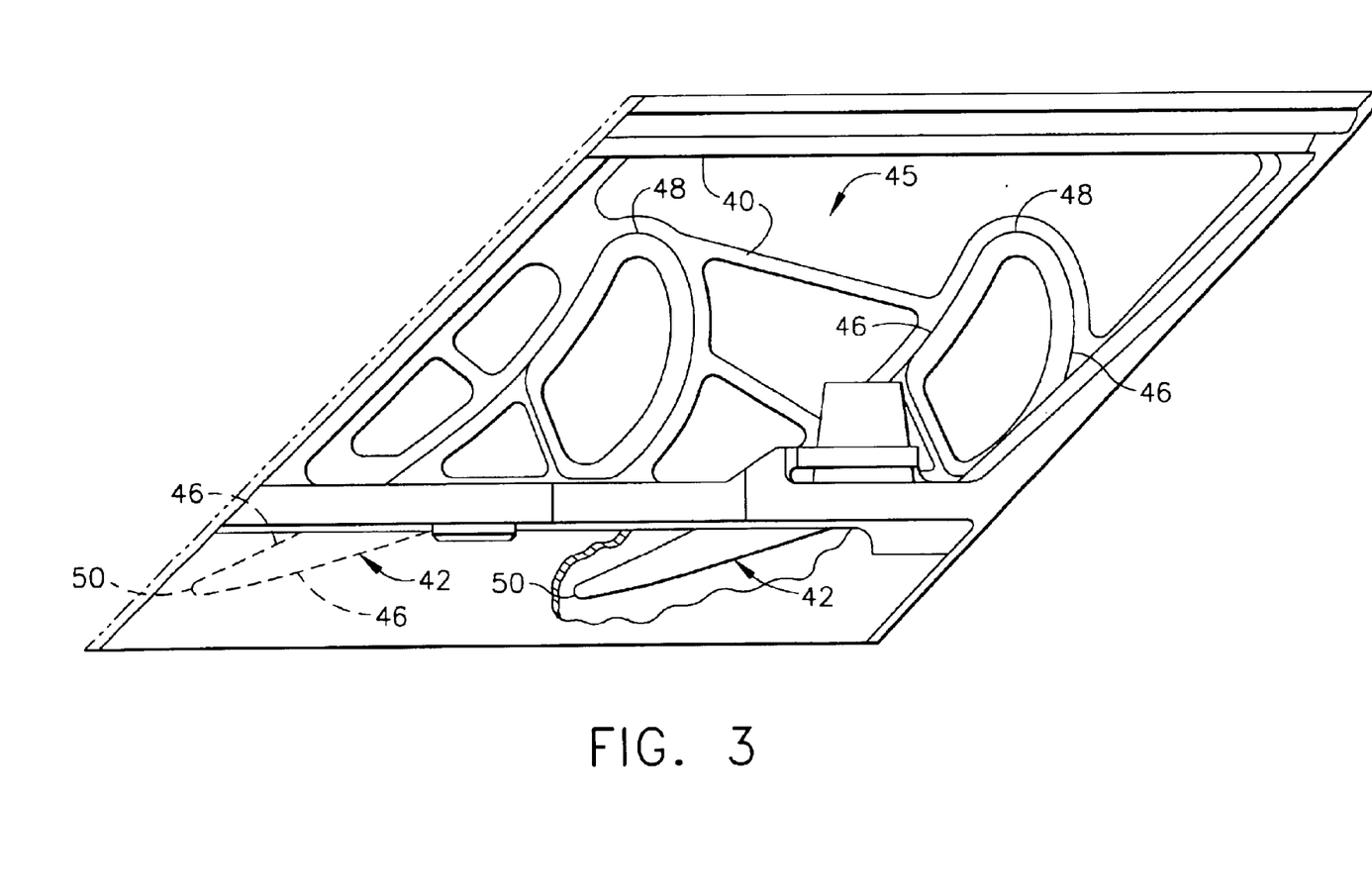
FIG. 3 is a radially outward view of a pair of nozzle vanes, taken from the view of line 3–3 in FIG. 2.
Figure 4:
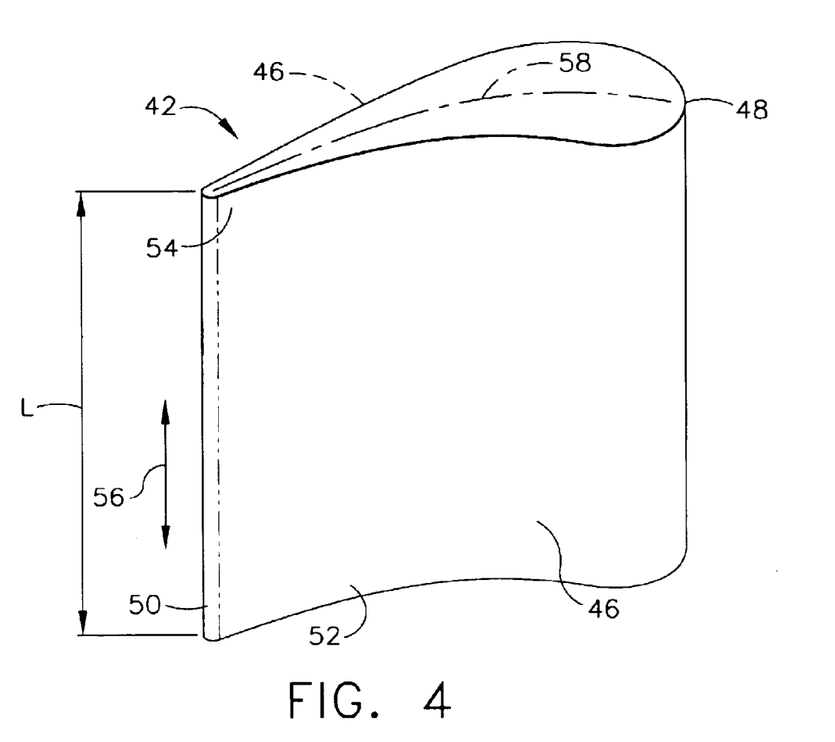
FIG. 4 is a perspective view of one of the nozzle vanes in isolation.

A pair 45 of the nozzle vanes 42 is illustrated in FIG. 3, which is a radial outward view of the gas turbine nozzle circumferential structure 28 near its periphery 44. Each nozzle vane 42 has opposed airfoil surfaces 46 that define a curved airfoil. Each nozzle vane 42 has a rounded leading edge 48 and a rounded trailing edge 50 that fair on each side into the airfoil surfaces 44. These elements may also be seen in the perspective view of FIG. 4. The nozzle vane 42 may be described as having a root 52 and a tip 54, and a length L between the root 52 and the tip 54. The trailing edge 50 extends between the root 52 and the tip 54 and lies generally parallel to a lengthwise direction 56. A curved nozzle vane centerline 58 extends from the leading edge 48 to the trailing edge 50, bisecting the thickness of the nozzle vane 42.

Figure 5:
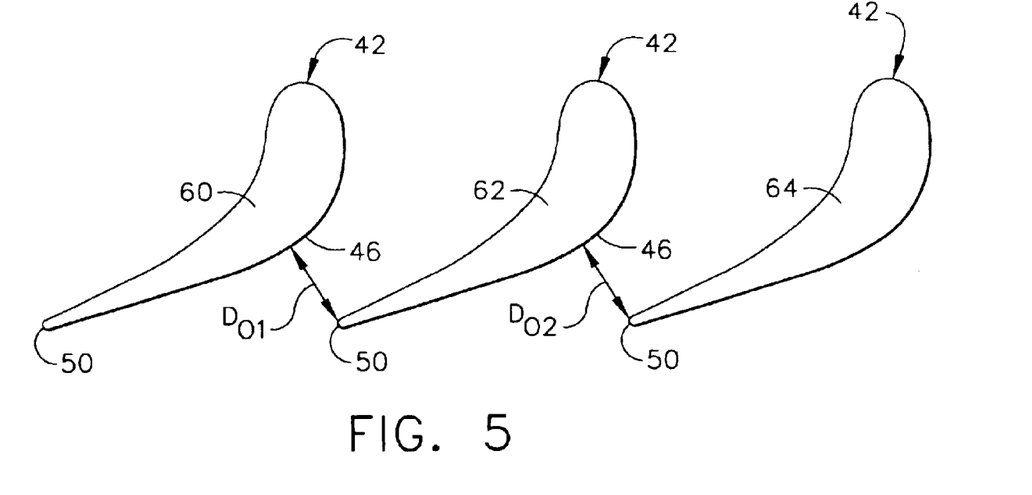
FIG. 5 is a schematic plan view of three nozzle vanes in isolation, forming two pairs of nozzle vanes.

FIG. 5 illustrates three of the nozzle vanes 60, 62, and 64. The nozzle vanes 60 and 62 comprise a first pair of nozzle vanes, and the nozzle vanes 62 and 64 comprise a second pair of nozzle vanes. A throat width $D_O$ is the distance of closest approach between the two nozzle vanes of each pair. The throat width $D_O$ is typically the distance between the trailing edge 50 of one nozzle vane and the nearest point on the facing airfoil surface 46 of the adjacent nozzle vane. For example, the throat width $D_{O1}$ is the distance between the trailing edge 50 of the nozzle vane 62 and the nearest point on the airfoil surface 46 of the nozzle vane 60; and the throat width $D_{O2}$ is defined as the distance between the trailing edge 50 of the nozzle vane 64 and the nearest point on the airfoil surface 46 of the nozzle vane 62. The throat area TA is the product of the throat width $D_O$ times the length L of the airfoil measured parallel to the lengthwise direction 56 (see FIG. 4).

A final pairwise throat area target range is a design goal range for the throat area TA of each pair of nozzle vanes 42, as for example the pair of nozzle vanes 60 and 62, and/or the pair of nozzle vanes 62 and 64. An example of such as final pairwise throat target range $D_{O1}$ in a typical gas turbine engine is 1.41+/−0.01 square inch. A final total throat area target range is a design goal range for a sum TTA of the values of TA, summed over all of the pairs 45 of nozzle vanes 42 on the gas turbine nozzle circumferential structure 28. The final pairwise throat area target range and the final total throat area target range are parameters selected by engine designers to optimize the performance of the gas turbine engine 20, and their specific values are not a part of the present approach. The present approach is concerned in part with providing a technique for adjusting the dimensions of the nozzle vanes 42 so as to achieve these parameters.

Figure 6:
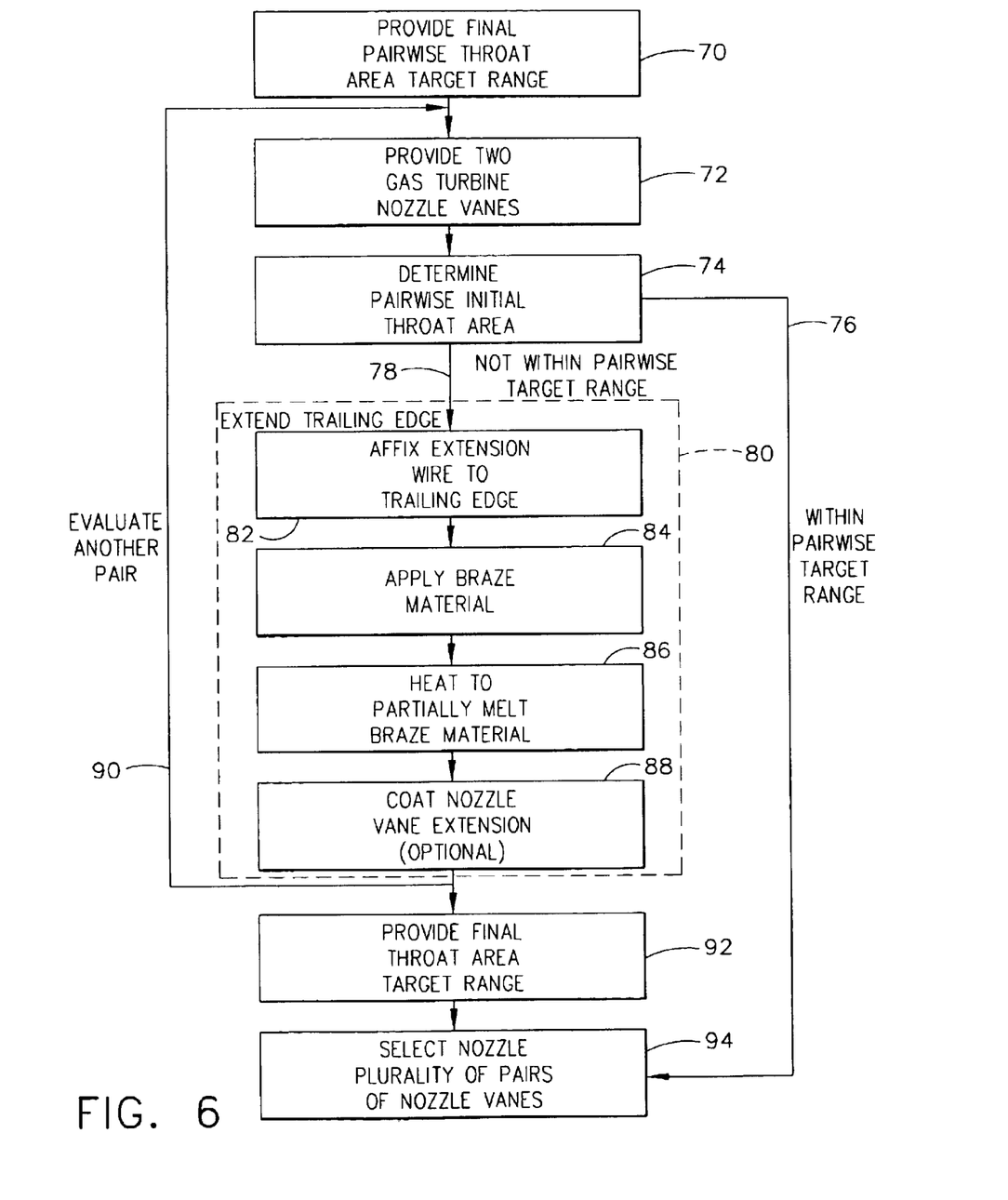
FIG. 6 is a block flow diagram of a preferred method for practicing the present approach.

FIG. 6 is a block flow diagram of an approach for establishing the final throat area of the gas turbine nozzle circumferential structure, and FIGS. 7–12 are views of the region of the trailing edge 50 of the nozzle vane 42 whose trailing edge is being extended. The airfoil surfaces 46 are also depicted in FIGS. 7–12.

A final pairwise throat area target range is provided, numeral 70. As discussed above, this is an input value to the present process, provided by the engine designers.

Figure 7:
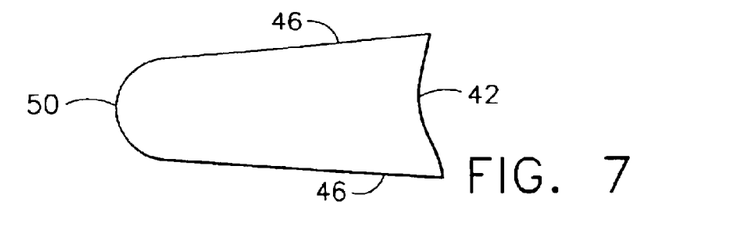
FIGS. 7–12 is a series of schematic fragmented enlarged sectional views perpendicular to the lengthwise direction of the nozzle vane at various stages of the method depicted in FIG. 6.

At least two gas turbine nozzle vanes 42 are provided, numeral 72, one of whose trailing edge regions 50 is shown in FIG. 7. The gas turbine nozzle vanes 42 have the shape discussed above, and are typically made of a nozzle-vane nickel-base superalloy as the base metal of the nozzle vanes 42. A nickel-base alloy is an alloy having more nickel than any other element, and a nickel-base superalloy is a nickel-base alloy strengthened by the precipitation of gamma prime or a related phase. An example of a nickel-base superalloy used as the nozzle-vane nickel-base superalloy to manufacture the gas turbine nozzle vanes 42 is Rene$^R$ 142, having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements. The gas turbine nozzle vanes 42 may instead be made of a cobalt-base alloy having more cobalt than any other element. An example of a cobalt-base alloy used to manufacture the gas turbine nozzle vanes 42 is alloy X-40, having a nominal composition in weight percent of about 0.5 percent carbon, about 1 percent manganese, about 1 percent silicon, about 25 percent chromium, about 2 percent iron, about 10.5 percent nickel, about 7.5 percent tungsten, balance cobalt and minor elements. These alloys are preferred, but the use of the present invention is not limited to these alloys used to make the nozzle vanes 42.

A pairwise initial throat area between each pair of gas turbine nozzle vanes 42 is determined, numeral 74, typically by dimensional measurements of the pair of gas turbine nozzle vanes in their mounted and supported configuration as shown in FIG. 3. If that initial throat area is within the final pairwise throat area target range, that pair of nozzle vanes is satisfactory and is passed to final processing, numeral 76. (If the initial throat area is smaller than the final pairwise throat area target range, a small amount of material may be removed from the appropriate trailing edge 50, as by grinding, and the pair of gas turbine nozzle vanes passed to final processing, numeral 76. This situation is seldom found in practice.)

For each pair of gas turbine nozzle vanes whose pairwise initial throat area is not within the final pairwise throat area target range and is in fact below the final pairwise throat area target range, the trailing edge 50 of at least one of the gas turbine nozzle vanes 42 is extended, numeral 80, responsive to the step 74 of determining the initial pairwise throat area, so that the final pairwise throat area of that pair of gas turbine nozzle vanes 42 is within the final pairwise throat area target range.

Figure 8:
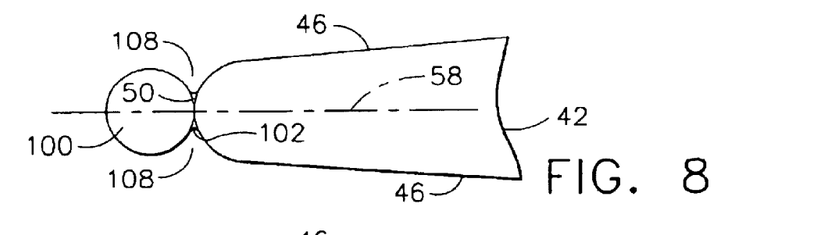

To extend the trailing edge 50, an extension wire 100 is affixed, numeral 82, to the rounded trailing edge 50 and extending along the trailing edge 50 parallel to the lengthwise direction 56. The extension wire 100 is preferably round in cross section, but may have other cross-sectional shapes. The extension wire 100 has a diameter sufficient to extend the trailing edge 50 by the desired amount. In a preferred approach, the extension wire 100 has a diameter of about 0.045 inch. The extension wire 100 is made of a material having a high-temperature capability comparable with that of the nozzle vane 42 itself. In a preferred case, the extension wire 100 is made of an extension-wire nickel-base superalloy such as Rene$^R$ 142 alloy. The extension wire 100 is preferably affixed by periodic tack welds 102, as shown in FIG. 8, to the trailing edge 50, extending outwardly from the nozzle vane 42 and away from the airfoil surfaces 46 so that it lies on an outward projection of the nozzle vane centerline 58. The tack welds 102 are not the primary attachment mechanism providing the desired strength to hold the extension wire 100 to the trailing edge 50 in service, and instead need only be sufficient to hold the extension wire 100 in place adjacent to the trailing edge 50 during the subsequent brazing operation.

Figure 9:
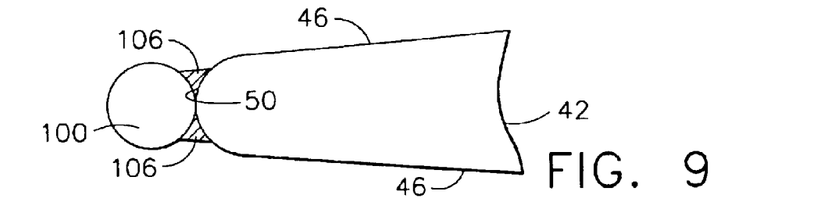

A braze material 104 is applied, numeral 84, overlying the extension wire 100 and the trailing edge 50. The braze material may be applied in one layer or more than one layer. The preferred approach is to use two layers. A first layer 106, shown in FIG. 9, is applied first. The preferred first layer 106 is preferably a high-melt filler alloy that has good high-temperature properties. The first layer 106 is preferably a slurry of powder particles of a nickel-base superalloy of the same material as the base metal of the nozzle vane, such as Rene$^R$ 142 in the preferred case. The first layer 106 may instead be a slurry of another type of alloy, such as the nickel-base superalloy Rene$^R$ R N4, having a nominal composition, in weight percent, of about 7.5 percent cobalt, about 9.75 percent chromium, about 1.5 percent molybdenum, about 6.0 percent tungsten, about 4.8 percent tantalum, about 4.2 percent aluminum, about 3.45 percent titanium, about 0.15 percent hafnium, about 0.05 percent carbon, about 0.004 percent boron, about 0.5 percent niobium, balance nickel and minor elements. The first layer 106 preferably is made of a metal having a first-layer melting point greater than that of a brazing temperature to be discussed below. The powder particles of the first layer 106 are typically slurried in polyethylene oxide (PEO) carrier liquid, with the slurry having a sufficient viscosity that it may be applied into a V-shaped gap region 108 (FIG. 8). The first layer 106 is applied into and in a sufficient amount to fill the V-shaped gap regions 108 (one on each side of the nozzle vane 46, see FIG. 9) between the extension wire 100 and the trailing edge 50. The first layer 106 is smoothed to provide a good fairing of the shape of the extension wire 100 into the airfoil surfaces 46. The slurry is allowed to dry in place by partial evaporation of the carrier. Complete evaporation of the carrier occurs in the subsequent heating step.

Figure 10:
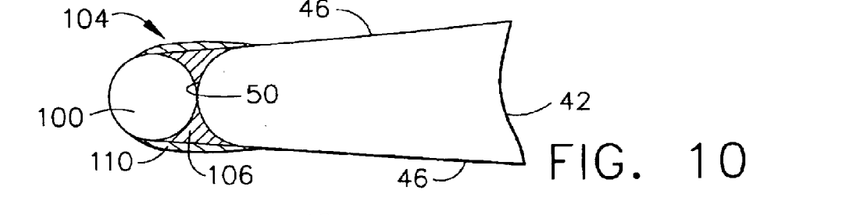

A second layer 110 of a braze composition is applied overlying the first layer 106, as shown in FIG. 10. The second layer 110 is preferably a second-layer nickel-base superalloy having a second-layer-nickel-base-superalloy melting point of at least one component that is less than the brazing temperature. The second layer 110 preferably includes at least two components, a first component having a first-component melting point greater than the brazing temperature and a second component having a second-component melting point less than the brazing temperature. A most preferred second-layer nickel-base superalloy is a two-component mixture of 60 percent by weight of Rene$^R$ 142 nickel-base superalloy powder, and 40 percent by weight of Rene$^R$ 80 nickel-base superalloy powder modified by the addition of silicon and optionally boron to reduce its melting point. This modified Rene$^R$ 80 material has a nominal composition, in weight percent, of about 0.16 percent carbon, about 4.5 percent silicon, about 14.0 percent chromium, about 9.5 percent cobalt, about 4.9 percent titanium, about 4.0 percent molybdenum, about 4.0 percent tungsten, about 3.0 percent aluminum, about 0.65 percent boron, about 0.03 percent zirconium, balance nickel and minor elements. The second layer 110 is of any operable thickness, but is typically from about 0.020 to about 0.050 inch thick. This braze material was selected due to its several-fold improvement in uncoated oxidation resistance as compared with prior braze materials such as that set forth in U.S. Pat. No. 4,830,934, and an improvement of up to about ten times when coated with an aluminide coating.

An alternative material for the second layer 110 is SA650 alloy, having a nominal composition, in weight percent, of about 22–28 percent cobalt, about 16.5–20 percent chromium, about 3.8–4.4 percent titanium, about 2.2–2.8 percent aluminum, about 1.9–2.4 percent tantalum, about 0.6–1.3 percent niobium, about 0.4–0.65 percent molybdenum, about 1.9–2.25 percent tungsten, about 0.95–1.25 percent boron, about 0.03–0.08 percent hafnium, 0.030 percent maximum oxygen, 0.030 percent maximum nitrogen, balance nickel and minor elements.

Figure 11:
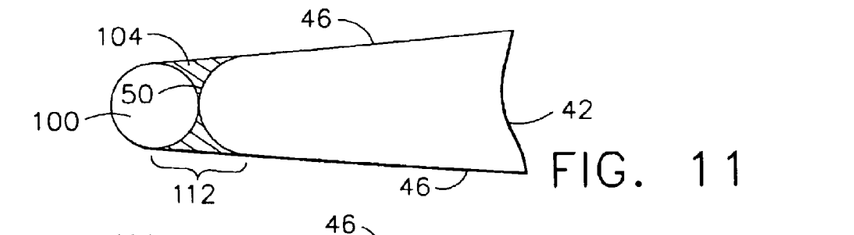

The braze material 104, including the layers 106 and 110, is heated, numeral 86, to a brazing temperature to melt at least a portion of the braze material, the lower-melting component of the second layer 110 in the preferred case. Typically, the entire structure of the nozzle vane 42, the extension wire 100, and the braze material 104 is heated to the brazing temperature in an oven. The brazing temperature is greater than the melting point of the lower-melting component of the second layer 110 and less than the melting point of the base metal of the nozzle vane 42 and the extension wire 100, and also typically less than the melting point of the first layer 106. In the preferred embodiment, the brazing temperature is from about 2190° F. to about 2240° F. While the assembly is above the brazing temperature, the Rene$^R$ 80 powder component of the second layer 110 melts (the Rene$^R$ 142 powder remaining unmelted), infiltrates the powder mass of the first layer 106, wets the powder particles of the first layer 106, and wets the trailing edge 50 and the extension wire 100. Upon cooling to a temperature less than the brazing temperature and ultimately to room temperature, the melted component solidifies and bonds the extension wire 100 and the braze material 104 to the trailing edge through the medium of the final braze metal 104, as shown in FIG. 11, forming the trailing edge extension 112. If the described processing leaves the trailing edge extension 112 too long, an appropriate amount may be removed, as by grinding.

Because of the curvature of the nozzle vanes 42, the lengthening of the trailing edge 50 reduces the dimension $D_O$, and thereby reduces the pairwise throat area of the two adjacent nozzle vanes 42.

Figure 12:
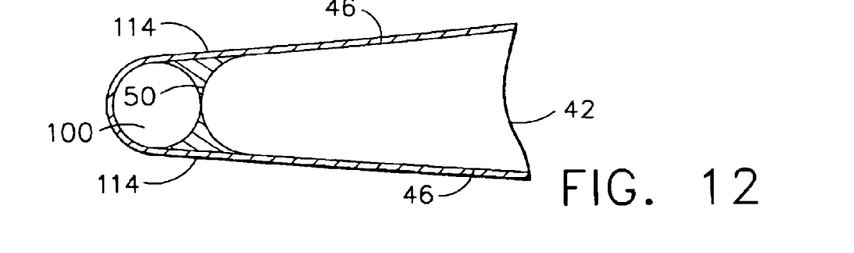

Optionally, the trailing edge extension 112 may be coated, numeral 88, with a protective coating 114. The coating step 88 usually is performed in conjunction with the application of the same protective coating 114 to the remainder of the surface of the nozzle vane 42. The protective coating 114 may be of any operable type, such as a diffusion or overlay aluminum coating of the type known in the art, and optionally with the application of a thermal barrier coating of the type known in the art.

The extension of the trailing edge 50, numeral 80 of FIG. 6, is here described as part of the overall method for achieving the desired final throat areas. However, the extension method 80 may be practiced by itself, for other reasons.

The steps 72–88 are repeated for another pair of nozzle vanes 42, numeral 90, until all of the pairs of nozzle vanes are properly sized with the desired dimensions to achieve the desired final pairwise throat area target range (TA) in each case.

The final total throat area target range is provided, numeral 92, as an input parameter. From the pairs of nozzle vanes 42 that are already established to have their final throat areas within the final pairwise throat area target range, a nozzle plurality of pairs of gas turbine nozzle vanes that together comprise the gas turbine nozzle circumferential structure 28 is selected, numeral 94. The selection criterion is that a sum of their final pairwise throat areas must be within the final total throat area target range (TTA).

The approach of FIG. 6 has been practiced on actual sets of nozzle vanes, with good results. The final throat areas, both pairwise and total, are within the desired throat area target ranges.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for extending a rounded trailing edge of a gas turbine nozzle vane, comprising the steps of:
   providing a gas turbine nozzle vane having a leading edge and the rounded trailing edge extending lengthwise between a root and a tip of the gas turbine nozzle vane, and a pair of opposed airfoil surfaces extending between the leading edge and the trailing edge to define an airfoil profile;
   affixing an extension wire to the trailing edge extending lengthwise along the trailing edge;
   applying a braze material to the extension wire and the trailing edge; and
   heating the braze material to a brazing temperature to melt at least a portion of the braze material and, upon cooling, to bond the extension wire and the braze material to the trailing edge, wherein there is no deposition of material other than a protective coating onto the airfoil surfaces.

2. The method of claim 1, wherein the gas turbine nozzle vane is made of a nozzle-vane nickel-base superalloy, and the extension wire is made of an extension-wire nickel-base superalloy.

3. The method of claim 2, wherein the extension-wire nickel-base superalloy has a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel.

4. A method for extending a rounded trailing edge of a gas turbine nozzle vane, comprising the steps of:

providing a gas turbine nozzle vane having the rounded trailing edge extending lengthwise between a root and a tip of the gas turbine nozzle vane;

affixing an extension wire to the trailing edge extending lengthwise along the trailing edge;

applying a braze material to the extension wire and the trailing edge, wherein the step of applying the braze material includes the steps of:

applying a first layer of a high-melt filler alloy into a gap region between the extension wire and the trailing edge, and thereafter applying a second layer of a braze composition overlying the first layer; and heating the braze material to a brazing temperature to melt at least a portion of the braze material and, upon cooling, to bond the extension wire and the braze material to the trailing edge.

5. The method of claim 4, wherein the first layer is a first-layer nickel-base superalloy having a first-layer-nickel-base-superalloy melting point greater than the brazing temperature.

6. The method of claim 5, wherein the first-layer nickel-base superalloy is selected from the group consisting of a first nickel-base superalloy having a nominal composition, in weight percent, of about 7.5 percent cobalt, about 9.75 percent chromium, about 1.5 percent molybdenum, about 6.0 percent tungsten, about 4.8 percent tantalum, about 4.2 percent aluminum, about 3.45 percent titanium, about 0.15 percent hafnium, about 0.05 percent carbon, about 0.004 percent boron, about 0.5 percent niobium, balance nickel, and a second nickel-base superalloy, having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel.

7. The method of claim 4, wherein the second layer is a second-layer nickel-base superalloy having a second-layer-nickel-base-superalloy melting point less than the brazing temperature.

8. The method of claim 7, wherein the second-layer nickel-base superalloy is a mixture of a first component having a first-component melting point greater than the brazing temperature and a second component having a second-component melting point less than the brazing temperature.

9. The method of claim 7, wherein the second-layer nickel-base superalloy is a mixture of a first nickel-base superalloy, having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements, and a second nickel-base superalloy modified by the addition of silicon and boron and having a nominal composition, in weight percent, of about 0.16 percent carbon, about 4.5 percent silicon, about 14.0 percent chromium, about 9.5 percent cobalt, about 4.9 percent titanium, about 4.0 percent molybdenum, about 4.0 percent tungsten, about 3.0 percent aluminum, about 0.65 percent boron, about 0.03 percent zirconium, balance nickel and minor elements.

10. The method of claim 1, wherein the brazing temperature is from about 2190° F. to about 2240° F.

11. A method for establishing a final throat area of a gas turbine nozzle circumferential structure, comprising the steps of:

providing a final pairwise throat area target range;

providing at least two gas turbine nozzle vanes; thereafter determining a pairwise initial throat area between each pair of gas turbine nozzle vanes; and thereafter, for each pair of gas turbine nozzle vanes whose pairwise initial throat area is not within the final pairwise throat area target range, extending a trailing edge of at least one of the gas turbine nozzle vanes responsive to the step of determining the initial pairwise throat area, so that the final pairwise throat area is within the final pairwise throat area target range, wherein the step of extending includes the steps of:

providing one of the gas turbine nozzle vanes having a rounded trailing edge extending lengthwise between a root and a tip of the gas turbine nozzle vane, affixing an extension wire to the trailing edge extending lengthwise along the trailing edge, applying a braze material overlying the extension wire and the trailing edge, and brazing the braze material to the extension wire and to the trailing edge.

12. The method of claim 11, wherein the step of providing includes the step of providing a nozzle plurality of pairs of gas turbine nozzle vanes together comprising the gas turbine nozzle circumferential structure.

13. The method of claim 11, including an additional step, of providing a final total throat area target range, and selecting a nozzle plurality of pairs of gas turbine nozzle vanes that together comprise the gas turbine nozzle circumferential structure, wherein a sum of their final pairwise throat areas is within the final total throat area target range.

14. The method of claim 1, including an additional step, after the step of heating, of applying a protective coating overlying at least a portion of the gas turbine nozzle vane.

15. The method of claim 11, wherein the step of extending includes an additional step, after the step of brazing, of applying a protective coating overlying at least a portion of the gas turbine nozzle vane.

16. A method for establishing a final throat area of a gas turbine nozzle circumferential structure, comprising the steps of providing a final pairwise throat area target range;

providing at least two gas turbine nozzle vanes, each of the nozzle vanes having a rounded leading edge, a rounded trailing edge, and a pair of opposed airfoil surfaces extending between the leading edge and the trailing edge and that define an airfoil profile; thereafter determining a pairwise initial throat area between each pair of gas turbine nozzle vanes; and thereafter, for each pair of gas turbine nozzle vanes whose pairwise initial throat area is not within the final pairwise throat area target range, of extending a trailing edge of at least one of the gas turbine nozzle vanes responsive to the step of determining the initial pairwise throat area, so that the final pairwise throat area is within the final pairwise throat area target range, wherein there is no deposition of material other than a protective coating onto the airfoil surfaces in the step of extending.

17. The method of claim 16, wherein the step of extending includes the step of applying a protective coating overlying at least a portion of the gas turbine nozzle vane.

18. The method of claim 16, wherein the step of extending includes the step of applying a protective coating overlying at least a portion of the gas turbine nozzle vane, wherein the protective coating is selected from the group consisting of a diffusion aluminum coating and an overlay aluminum coating.

19. The method of claim 16, wherein the step of extending includes the steps of:

affixing an extension wire to the trailing edge extending lengthwise along the trailing edge, applying a braze material overlying the extension wire and the trailing edge, and brazing the braze material to the extension wire and to the trailing edge.

20. The method of claim 4, including an additional step, after the step of extending, of applying a protective coating overlying at least a portion of the gas turbine nozzle vane after the step of brazing.

* * * * *

UNITED STATES PATENT AND TRADEMARK OFFICE
CERTIFICATE OF CORRECTION

PATENT NO. : 6,789,315 B2
DATED : September 14, 2004
INVENTOR(S) : Marques et al.

It is certified that error appears in the above-identified patent and that said Letters Patent is hereby corrected as shown below:

Column 6,
Line 42, "Reno$^R$ RN4" should read -- Reno$^R$ N4 --.

Signed and Sealed this

First Day of March, 2005

JON W. DUDAS
*Director of the United States Patent and Trademark Office*